United States Patent [19]

Okamoto et al.

[11] Patent Number: 4,475,860

[45] Date of Patent: Oct. 9, 1984

[54] APPARATUS FOR DISCHARGING RADIOACTIVE WASTE FROM ITS CONTAINER

[75] Inventors: Magoji Okamoto, Nagoya; Norio Okamoto, Tokyo, both of Japan

[73] Assignee: NGK Insulators, Ltd., Nagoya, Japan

[21] Appl. No.: 379,500

[22] Filed: May 18, 1982

[30] Foreign Application Priority Data

May 22, 1981 [JP] Japan .............................. 56-76692

[51] Int. Cl.$^3$ .............................. B65G 65/40

[52] U.S. Cl. .............................. 414/416; 414/730; 414/753

[58] Field of Search .............................. 414/416, 419, 421, 730, 414/732, 750, 751, 753; 104/303

[56] References Cited

U.S. PATENT DOCUMENTS

| | | | |
|---|---|---|---|
| 1,145,927 | 7/1915 | Shorten | 414/416 |
| 3,583,328 | 6/1971 | Schell | 104/303 X |
| 4,051,783 | 10/1977 | Caliri | 104/303 |
| 4,084,706 | 4/1978 | Russell | 414/421 X |
| 4,201,510 | 5/1980 | Muntjanoff | 414/730 |
| 4,231,701 | 11/1980 | Middleton et al. | 414/730 |

FOREIGN PATENT DOCUMENTS

| | | | |
|---|---|---|---|
| 350231 | 12/1931 | Australia | 414/416 |
| 208116 | 10/1955 | Australia | 414/419 |
| 322083 | 6/1920 | Fed. Rep. of Germany | 414/416 |
| 2063122 | of 0000 | United Kingdom | 414/753 |

*Primary Examiner*—Robert J. Spar
*Assistant Examiner*—Ken Muncy
*Attorney, Agent, or Firm*—Parkhurst & Oliff

[57] ABSTRACT

An apparatus for discharging radioactive waste from its container comprises a truck movable toward and away from the container by a driving motor, a seizing member including claws capable of closing and opening to seize and release the radioactive waste little by little, a cylinder connected to the seizing member for closing and opening the claws, a further cylinder for tilting the seizing member downwardly to eject the seized waste and a detector for detecting pressure caused by the seizing member penetrating into the waste when the truck is driven toward the container by the driving motor to produce signals for stopping the truck and operating the first mentioned cylinder to close the claws. The apparatus safely and securely discharges little by little the radioactive waste filled in the storage container without any risk of exposing operators to the radioactive radiation emitted from the waste, thereby saving time and labor and making easy next processes for burning it.

3 Claims, 7 Drawing Figures

APPARATUS FOR DISCHARGING RADIOACTIVE WASTE FROM ITS CONTAINER

BACKGROUND OF THE INVENTION

1. Field of the Invention

This invention relates to an apparatus for discharging radioactive waste filled and stored in its storage container therefrom with safety and security.

2. Description of the Prior Art

In general, various radioactive waste solids unavoidably produced in nuclear power stations, such as polyethylene or paper sheets, rags, discarded working clothes, gloves and the like are pressed and filled in storage containers such as drum cans which are stored in storehouses. In order to prevent these radioactive waste solids from decaying or decomposing, scattering to surroundings and causing fire and in order to greatly condense them or increase their densities, these waste solids are generally burned to ashes which are together with incombustible substances are packed by cement or asphalt or capsuled by glass. For this purpose, the radioactive waste pressed and stored in the storage containers such as drum cans must be safely and securely taken out of the storage containers.

Up to the present, the radioactive waste has been manually taken out of the storage container. However, as the waste is tightly pressed and filled in the storage container, it takes much time and labor to take the waste out of the container and what is worse still operators are likely to expose to radioactive radiation emitted directly from the radioactive waste or by inhaling the dusty radioactive waste.

Screw type discharging apparatuses may be also considered as mechanical ones. With such screw type apparatuses, however, as the radioactive waste filled in the storage container is discharged in the mass at a time, it is difficult to remove incombustible substances from the waste before burning it and therefore uniformly burning of the waste cannot be achieved.

SUMMARY OF THE INVENTION

It is, accordingly, an object of the present invention to overcome the disadvantages in the prior art apparatus for discharging the radioactive waste from its container and the present invention relates to the safely, firmly and automatically mechanical apparatus.

The foregoing object is accomplished in one embodiment by providing an apparatus for discharging a radioactive waste from its container comprising: a truck provided with driving means for the truck and arranged in opposition to an opening of said container; seizing means provided on a side of said opening of the container with respect to the truck and including claws capable of closing and opening for seizing and releasing said radioactive waste; a first cylinder connected to said seizing means for closing and opening said claws; a second cylinder located between said truck and said seizing means for tilting said seizing means downwardly; and a detector arranged between said truck and said seizing means for detecting pressure caused by said seizing means penetrating into said waste when said truck moves toward said opening of said container for taking said waste therefrom, signals from said detector being transmitted for stopping said truck moving toward said container and operating said first cylinder to close said claws.

DETAILED DESCRIPTION OF THE PREFERRED EMBODIMENT

Figure 1:
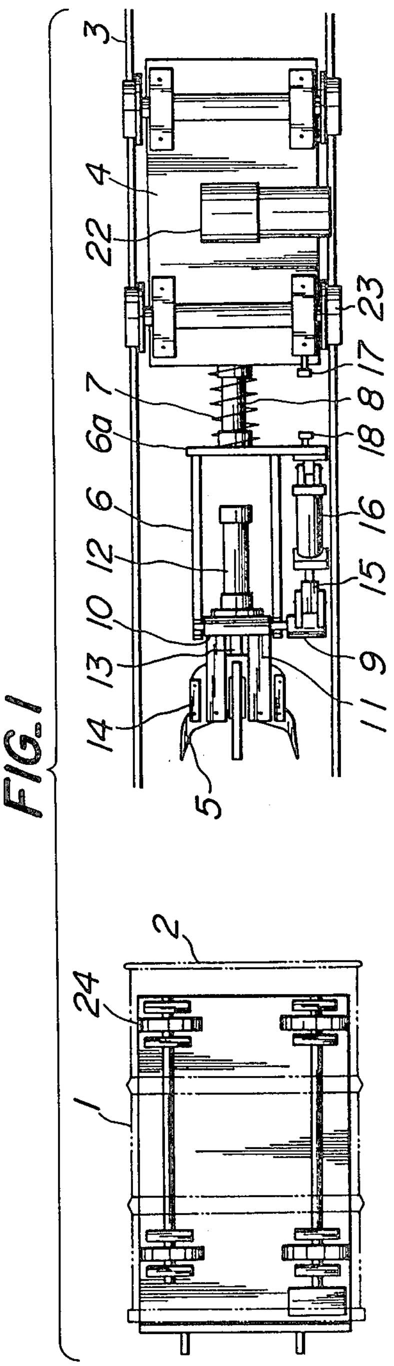
FIG. 1 is an explanatory plan view of one embodiment of the waste discharging apparatus according to the invention.
Figure 2:
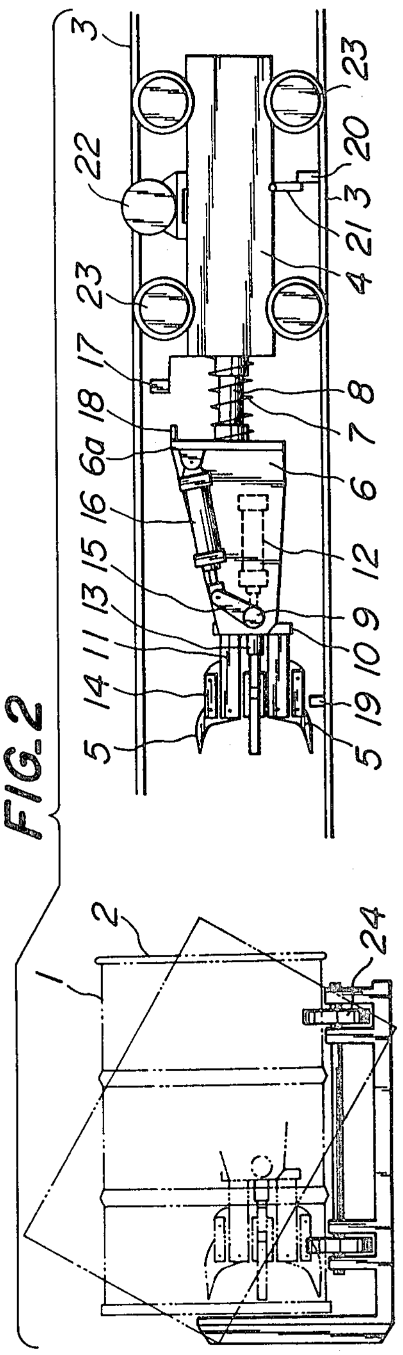
FIG. 2 is an explanatory side view of the apparatus shown in FIG. 1.

Referring to FIGS. 1 and 2 illustrating a preferred embodiment of the invention, the opposition to an opening 2 of a storage container such as a drum can accommodating therein pressed radioactive waste are located rails 3 on which is arranged a forwardly and rearwardly movable truck 4 mainly provided with wheels 23 and a motor 22 as driving means for the truck. The truck 4 further comprises at its front end claws 5 connected thereto capable of closing and opening for seizing and taking the pressed and packed waste out of the storage container 1. The claws 5 or seizing means comprise a plurality of, preferably four, claws adapted to be closed and opened by a mechanism later explained in details. To the truck 4 traveling on the rails 3 is connected a preferably U-shaped support arm 6 by a rod 8 through a spring 7 therebetween such that the support arm 6 is movable toward and away from the truck 4. As later explained, when the truck 4 moves toward the support arm 6 to shorten the distance therebetween, the spring is compressed to permit the rod 8 to enter the truck 4. The U-shaped support arm 6 carries on its front end a support plate 10 supported at its ends, at which one end is provided with a rotary shaft 9. To the support plate 10 are integrally fixed claw support rods 11 (preferably four) for the claws 5 and a first cylinder 12 for closing and opening the claws 5.

The first cylinder 12 includes a rod 13 extending through the support plate 10 and connected to curved portions of the respective claws 5 by connecting rods 14. An arm 15 is fixed to the rotary shaft 9. Between the other end of the arm 15 and an outward extention **6*a* of a top portion of the U-shaped support arm 6, as shown in FIG. 2, is fixedly arranged a second cylinder 16 for vertically pivotally moving the claws 5 together with the support plate 10 about the rotary shaft 9. The first and second cylinders 12 and 16 are pneumatically or hydraulically operated in reciprocative movements for closing and opening the claws 5 or seizing means and tilting downwardly the seizing means together with the support plate 10**.

Moreover, the truck 4 is provided on the side of the claws 5 with a pressing force detector 17 including a proximity switch or contactless switch for detecting the pressing force acting upon the waste by the claws 5 derived from the movement of the truck 4 toward the container 1. Facing to the pressing force detector 17 a dog 18 is provided on the extension **6*a* of the support arm 6 for actuating the detector 17. A forward end limit switch 19 and a backward end limit switch 20 for the truck 4 are provided in place on a base frame (not shown) and a dog 21 is located on the truck 4 for actuating the limit switches 19 and 20**.

The operation of the apparatus thus assembled according to the invention will be explained hereinafter referring to FIGS. **3*a*–3*e***.

Figure 3A:
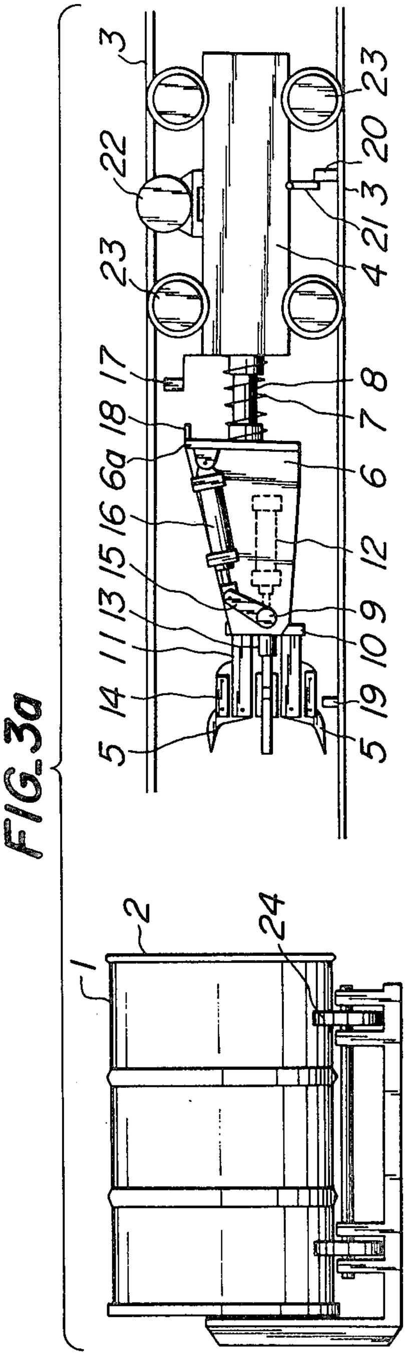
FIGS. 3*a*–3*e* are side views of the apparatus shown in FIG. 1 for explaining the respective steps of the operation of the apparatus.
Figure 3B:
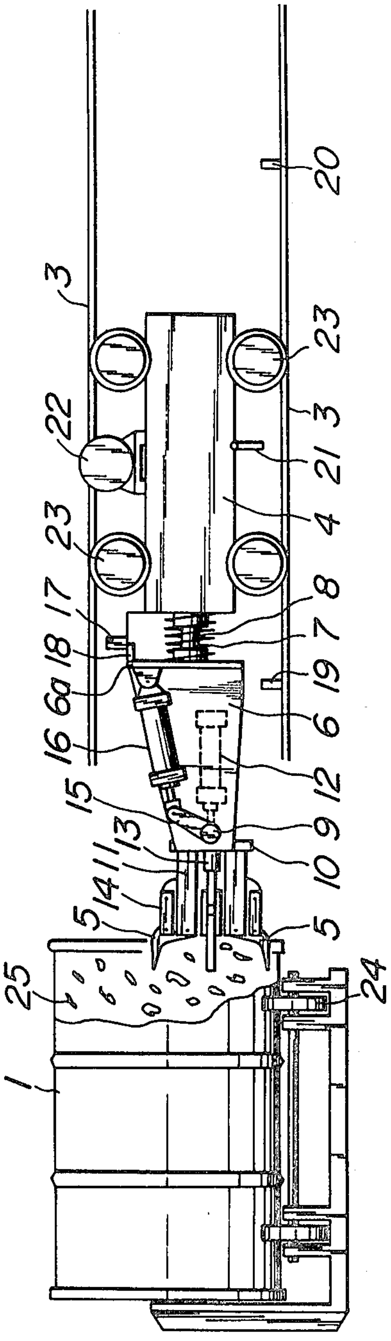
Figure 3C:
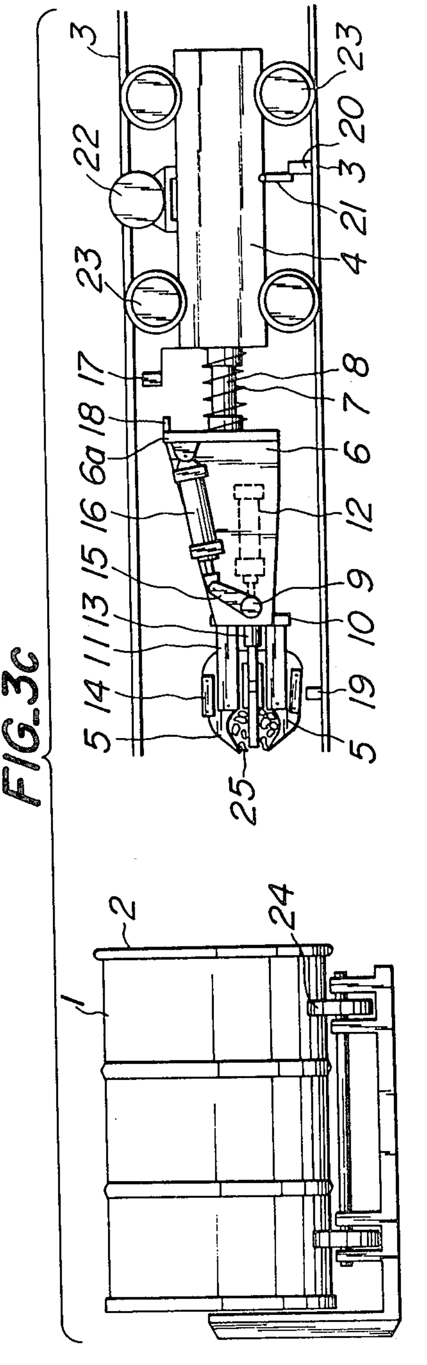
Figure 3D:
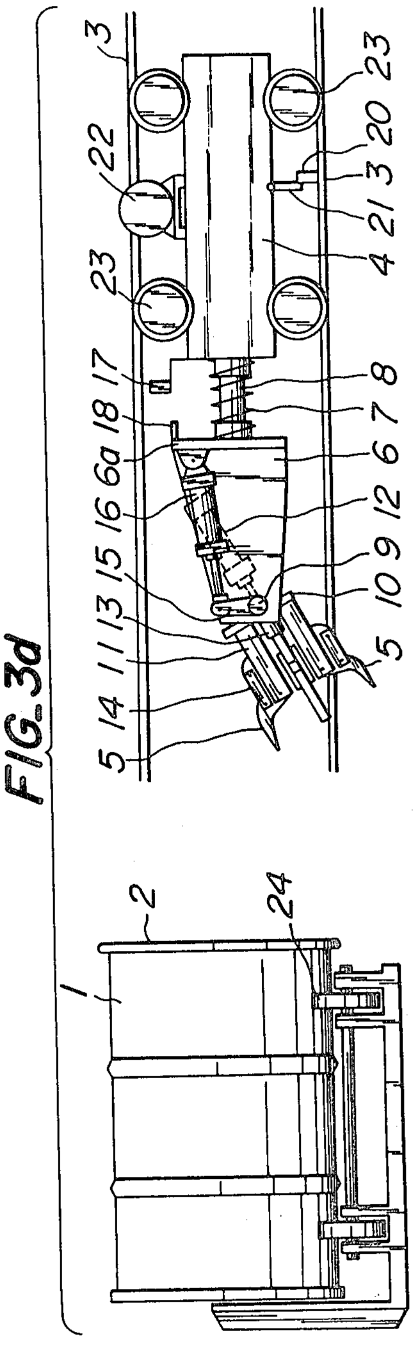
Figure 3E:
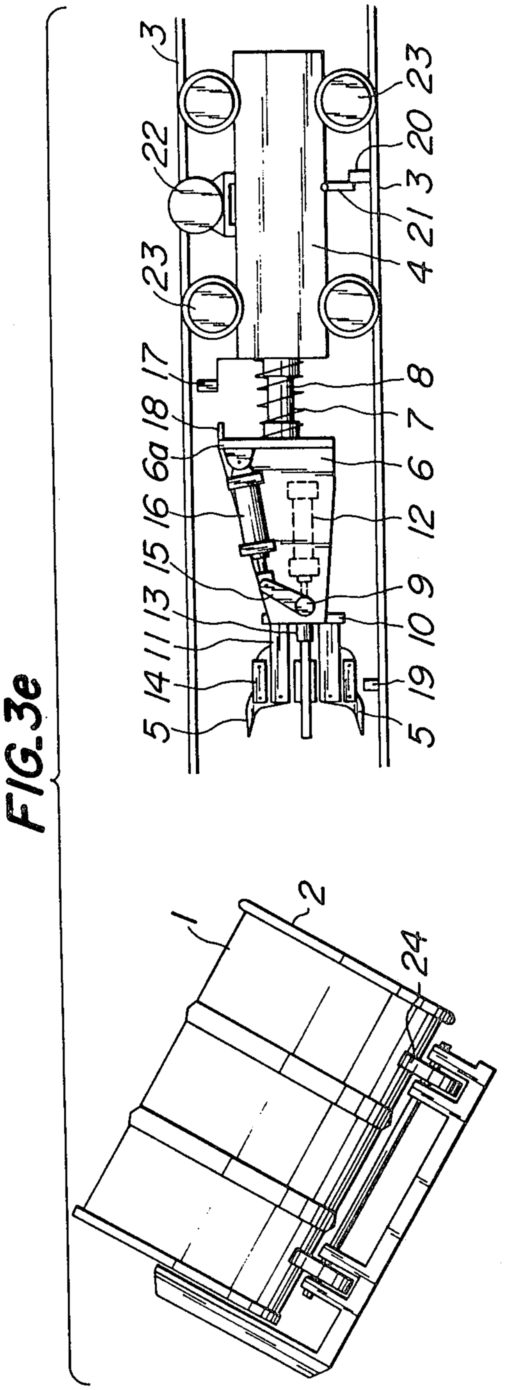

The storage container 1 such as a drum can filled with radioactive waste is horizontally supported on a storage container support means 24 with the opening 2 opened in opposition to the claws 5 (FIG. 3*a*). The truck 4 is advanced on the rails 3 by energization of a truck driving motor 22 to bring the claws 5 into contact with the waste 25 filled in the container 1. The truck 4 is further advanced to force the claws 5 against and into the waste 25 so that a reaction of the waste forces the rod 8 into the truck 4 against the force of the spring 7, with the result that the support arm 6 approaches the truck 4 until the dog 18 on the extension 6*a* of the support arm 6 contacts the pressing force detector 17 provided on the truck 4. At the moment, the pressing force detector 17 produces a signal deenergizing the truck driving motor 22 to stop the truck 4 and the first cylinder 12 closes the claws 5 penetrating in the waste so as to seize a small amount of the waste (FIG. 3*b*). After a few seconds presented by a timer (not shown), the truck 4 is retracted by reverse rotation of the truck driving motor, during which the claws remain seizing the waste, until the dog 21 contacts the backward end limit switch 20 for the truck 4 to stop it (FIG. 3*c*). At the same time, the first cylinder 12 is actuated to open the claws 5 which are simultaneously pivotally moved downwardly about the rotary shaft 9 to eject the radioactive waste downwardly into a hopper (not shown) or the like (FIG. 3*d*). After a few seconds determined by a timer or the like, the second cylinder 16 is actuated to return the claws to its normal position (FIG. 3*a*). The above operation is repeated in the same manner to take the radioactive waste little by little out of the storage container 1 so as to be discharged into the hopper with safety and security.

Even if the waste in the storage container 1 decreases to an extent that the claws could not seize the waste, the forward and backward movements of the truck 4 and closing and opening of the claws 5 are preferably repeated a few times after the actuation of the forward end limit switch 19, in order to remove a small amount of the waste which would often remain in the container.

Moreover, even if all the waste is taken out of the storage container 1, there is often a small amount of the other radioactive waste such as fine dust, iron or steel scraps or the like. In order to exhaust all such a radioactive waste securely, the storage container 1 is rotated, while it is kept in a forwardly inclined position together with the container support means 24 as shown in phantom lines in FIG. 2.

Furthermore, the above operations are, in general, continuously automatically effected. However, manually operated switches may be utilized for the purpose.

As can be seen from the above description, the apparatus according to the invention enables the radioactive waste filled in a storage container such as a drum can or the like to be exhausted safely and securely by automatically closing and opening claws provided on a truck, thereby exhausting the radioactive waste little by little without exposing operators to the radioactive radiation. The apparatus according to the invention is, therefore, applicable to treating operation for radioactive waste stored at nuclear power stations and is useful for industries.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. An apparatus for discharging a radioactive waste from its container comprising:
   - a truck provided with driving means for the truck and arranged in opposition to an opening of said container;
   - seizing means provided on a side of the truck on a side of said opening of the container and including claws capable of closing and opening for seizing and releasing said radioactive waste;
   - a first cylinder connected to said seizing means for closing and opening said claws;
   - a second cylinder located between said truck and said seizing means for tilting said seizing means downwardly; and
   - a detector arranged between said truck and said seizing means for detecting pressure caused by said seizing means penetrating into said waste when said truck moves toward said opening of said container for taking said waste therefrom, signals from said detector being transmitted for stopping said truck moving toward said container and operating said first cylinder to close said claws.

2. An apparatus as set forth in claim 1, wherein said apparatus further comprises means for holding said container, tilting said container to lower said opening and rotating said container.

3. An apparatus as set forth in claim 1 or 2, wherein said apparatus further comprises:
   - a limit switch for stopping said truck on a track to locate said seizing means holding the waste in place where said seizing means ejects the waste, thereby transmitting signals from said limit switch to said driving means for said truck, to said first cylinder for opening said claws of said seizing means and to said second cylinder for tilting said seizing means downwardly; and
   - timing means for instructing said first cylinder to give sufficient time to said claws of said seizing means for seizing the waste, for instructing said second cylinder to give sufficient time to said claws of said seizing means for completely ejecting the waste and thereafter to return said seizing means into its normal position, and for instructing said driving means to drive said truck toward said container after said ejection of the waste.

* * * * *